UNITED STATES PATENT OFFICE.

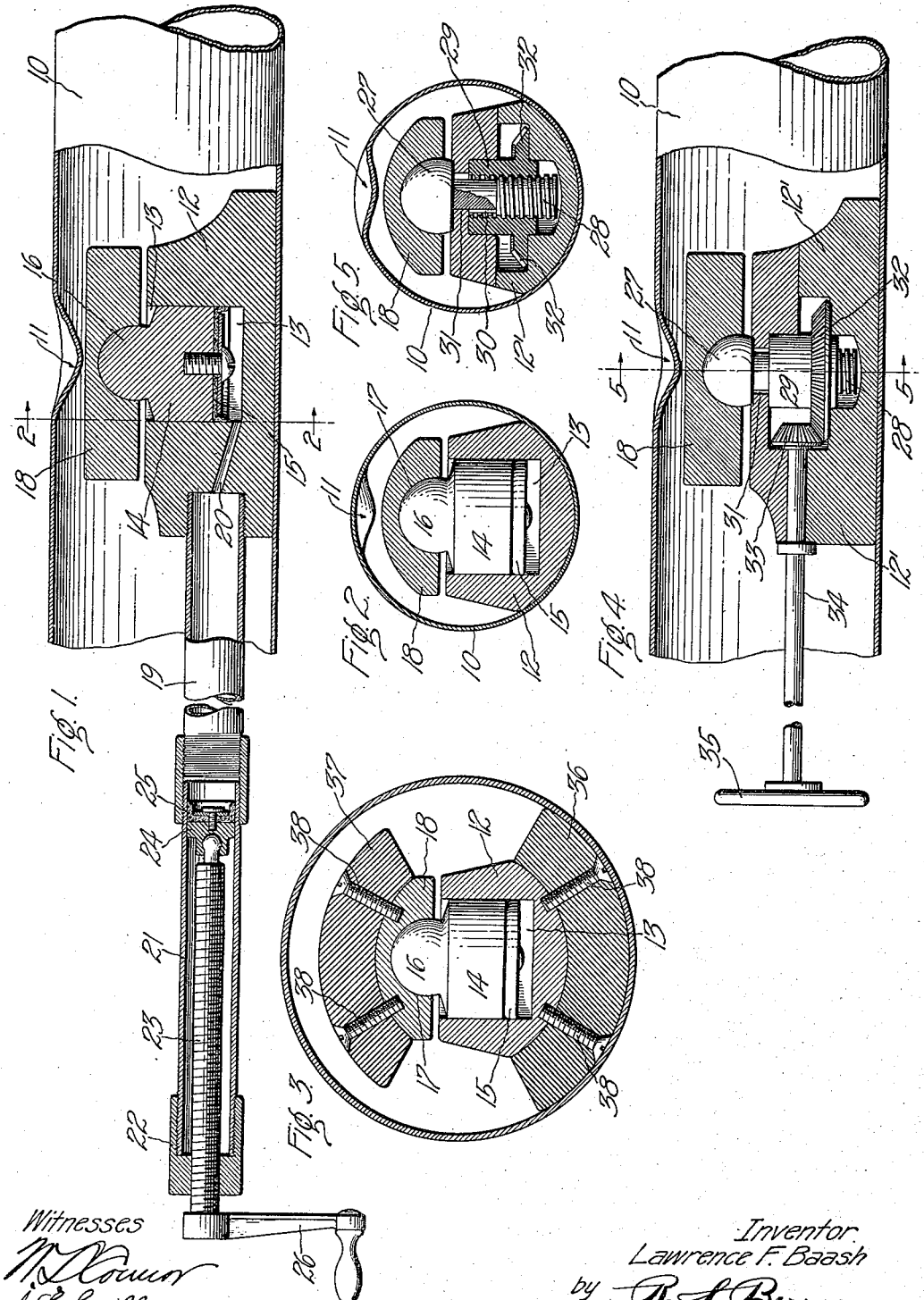

LAWRENCE F. BAASH, OF FILLMORE, CALIFORNIA.

PIPE OR CASING DENT REMOVER.

1,157,073.  Specification of Letters Patent.  Patented Oct. 19, 1915.

Application filed February 13, 1915. Serial No. 9,212.

*To all whom it may concern:*

Be it known that I, LAWRENCE F. BAASH, a subject of the Emperor of Germany, residing at Fillmore, in the county of Ventura, State of California, have invented new and useful Improvements in Pipe or Casing Dent Removers, of which the following is a specification.

This invention relates to a tool for removing dents from pipe or tubing such as casings for oil-wells and the like.

In the construction of oil-wells, tubular metallic casings are sunk into the earth to great depths; it being customary to first sink a string of casing of one diameter, then lower a second string of casing of smaller diameter through the first string and so on, thus employing casings of various diameters, with each succeeding string of casings of such outside diameter that it will clear the inner walls of the preceding string. It is therefore essential that the outer casings be free from indentations in order to permit the free passage therethrough of a succeeding string of casing of slightly less diameter and also permit the lowering of tools therethrough. The pipe or well casing becomes dented from various causes, especially after the casing has been sunk and thereafter removed, and is thus unfitted for use as the indentations inhibit the passing of the smaller casing sections and tools therethrough, which necessitates the removal of the indentations.

It is the object of this invention to provide a tool by means of which dents in a pipe or well casing may be easily and quickly removed.

Another object is to provide a casing dent remover which is so constructed that it may be introduced into a tubular casing of considerable length and operated to press indentations in the casing wall outwardly to restore the casing to its normal condition and which embodies means whereby the dent removing device can be operated from either end of a casing or pipe thereof.

A further object is to provide a dent remover having a ball-seated or swiveled shoe formed with a transversely curved operating face of a radius less than the radius of the casing and adapted to readily seat on the inner cylindrical wall of the pipe or casing to insure complete removal of the dent, on the shoe being pressed thereagainst.

A further object is to provide a device of the above character which is simple in construction and efficient in operation and which is adapted to be employed in casings of various diameters.

The invention is illustrated in the accompanying drawings in which:

Figure 1 is a view of the casing dent remover in longitudinal section showing it as applied. Fig. 2 is a detailed section on the line 2—2 of Fig. 1, partly in elevation. Fig. 3 is a view in cross section similar to Fig. 2, showing a removable cap on the shoe illustrating the device as adapted for use in casings of large diameter. Fig. 4 is a view in longitudinal section of a modified form of the invention. Fig. 5 is a view in section and elevation as seen on the line 5—5 of Fig. 4, as seen in the direction indicated by the arrows.

More specifically 10 indicates a tubular metallic casing and 11 denotes a dent formed therein. The present invention resides in a device by means of which the dent 11 may be removed and embodies a body member 12 adapted to be disposed within the casing 10 and having a transverse arcuate under side conforming to and adapted to seat on the inner circumferential wall of the casing 10 as particularly shown in Fig. 2; the curved face of the body member 12 being formed on a radius corresponding to that of the casing.

In the preferred form of the invention, shown in Figs. 1 and 2, the body member 12 is formed on its upper face with a cylindrical depression 13 arranged centrally thereof, in which a plunger 14 is reciprocally mounted and adapted to move in a direction at right angles to the axis of the casing. The plunger 14 is fitted with a cup leather 15 on its under side and is formed with a substantially semi-spherical member 16 on its upper end which extends into a socket 17 formed on the under side of a shoe 18.

The shoe 18 has a transverse arcuate upper face formed on a radius less than the radius of the inner wall of the casing 10 so that when the shoe 18 is caused to bear against the casing 10 in removing the dent 11, it will operate to press the dent outwardly a slight distance beyond the outer face of the casing, as will be later described. The shoe 18 is preferably rectangular in plan and is disposed on the plunger 14 with its arcuate face corresponding to the curvature of the inner wall of the casing. The under side of the shoe 18 is spaced from the base of the semi-spherical member 16 on the plunger 14 so that the shoe 18 may have a universal rocking movement.

Connecting with one end of the body member 12, extending longitudinally into the casing 10, is a pipe 19 of such length as to project beyond the outer end of the casing when the device is in use. The pipe 19 opens at its inner end to the bottom of the depression 13 through a passage 20 formed in the body member 12 as shown in Fig. 1. Mounted on the outer end of the pipe 19 and opening thereto is a cylinder 21 having a cap 22 on its outer end and extending into the cylinder 21 through a threaded aperture in the cap 22 is a threaded stem 23 which is designed to be rotated and moved longitudinally to reciprocate a piston 24 mounted thereon.

The piston 24 is provided with a cup leather 25, and interposed between the cup leather 25 and the cup leather 15 on the plunger 14 is a body of liquid, preferably oil, through which movement may be transmitted to the plunger 14 by advancing the threaded stem 23 and piston 24. The stem 23 is fitted with a crank 26 by which it may be manually rotated to advance or retract same in its threaded bearing to effect movement of the piston 24 and thereby cause the plunger 14 to move at right angles to the axis of the casing or pipe.

In the operation of the form of the invention just described, the piston 24 is retracted to permit the plunger 14 to gravitate downwardly in the depression 13 so as to dispose the upper face of the shoe 18 clear of the dent 11 in the casing 10 into which the body member 12 is introduced. The device is positioned in the casing 10 with the center of the plunger 14 beneath the dent 11. The casing 10 being previously heated adjacent the dent 11 to render it malleable, the stem 23 is rotated by means of the crank 26 to advance the piston 24 which will operate through the liquid in the pipe 19 to move the piston 14 toward the wall of the casing and cause the shoe 18 to press against the under side of the dent 11 and force the latter outwardly; the area of the plunger 14 being greater than that of the piston 24 so that increased force will be transmitted to the plunger. The arcuate face of the shoe 18, by reason of being formed on a radius less than the inner arcuate wall of the casing 10, will force the dent outwardly a slight distance beyond the outer face of the casing 10 so that when the latter cools and shrinks the previously indented portion of the casing will extend flush with the casing wall.

In event the shoe 18 is not positioned directly beneath the dent 11, the shoe will rock on its swivel mounting on the plunger 14 so as to equalize the strains on the plunger 14 and prevent binding of the latter in the depression 13; the swivel mounting of the shoe 18 also insuring its being positioned to conform to the curvature of the casing 10.

When it is desired to retract the plunger 14, the stem 23 is rotated in a reverse direction to retract the piston 24, thus relieving the plunger 14 of pressure on its under side and permitting it to gravitate to its normal position.

In the modified form of the invention illustrated in Figs. 4 and 5, the shoe 18 is seated on a ball 27 carried on a threaded stem 28 engaging an internally threaded sleeve 29 mounted in the body member 12'. The stem 28 is formed with a longitudinally extending channel 30 engaged by a lug 31 on the body member 12' by means of which the stem 28 is held against rotation but is permitted to have longitudinal movement in relation to the body member 12'. Formed on the sleeve 29 is a beveled gear 32 which meshes with a pinion 33 on a shaft 34 having one end journaled in the body member 12' and its outer end extending exteriorly of the casing 10. The shaft 34 may be rotated by means of a hand-wheel 35 mounted on its outer end. In the operation of this form of the invention the shoe 18 is advanced or retracted by rotating the sleeve 29 through the medium of the gear 32 and pinion 33 and shaft 34; rotation of the sleeve 29 operating to move the stem 28 longitudinally at right angles to the axis of the casing or pipe.

When it is desired to adapt the device for use in casings of large diameters the body member 12 and the shoe 18 are fitted with the demountable caps 36 and 37, respectively, as particularly shown in Fig. 3; the cap 36 having a curved under face formed on a radius corresponding to that of the casing 10 and the cap 37 having an upper face formed on a radius less than the radius of the casing. The caps 36 and 37 may be attached to the body member 12 and shoe 18 in any desired manner; screws 38 being here shown as provided for that purpose.

It is manifest that various means may be employed for reciprocating the plunger 14 or advancing and retracting the shoe 18 by which the latter may be moved in and out of contact with the inner wall of the casing 10.

What I claim is:

1. A casing dent remover comprising a body having an arcuate lower face and forming a tubular chamber on its upper face, a plunger reciprocally mounted in said chamber, a shoe having a transverse arcuate face, a ball and socket connection between said shoe and plunger whereby the shoe may have a swivel movement, and fluid operating means for reciprocating said plunger, substantially as described.

2. A casing dent remover comprising a body having an arcuate lower face and forming a tubular chamber on its upper face, a plunger reciprocally mounted in said chamber, a shoe having a transverse arcuate face, a swiveled connection between said shoe and plunger, and means for operating said plunger from a remote point, said last mentioned means comprising a fluid conduit leading to the lower part of said tubular chamber and a plunger for forcing the fluid through said conduit into said chamber, substantially as described.

In witness that I claim the foregoing I have hereunto subscribed my name this 6th day of Feb., 1915.

LAWRENCE F. BAASH.

Witnesses:
LULA MAE TODD,
JNO. A. GALVIN.